June 25, 1963
H. W. CONLEY
3,095,009
BATTERY LIQUID LEVEL CHECKER
Filed Nov. 21, 1960
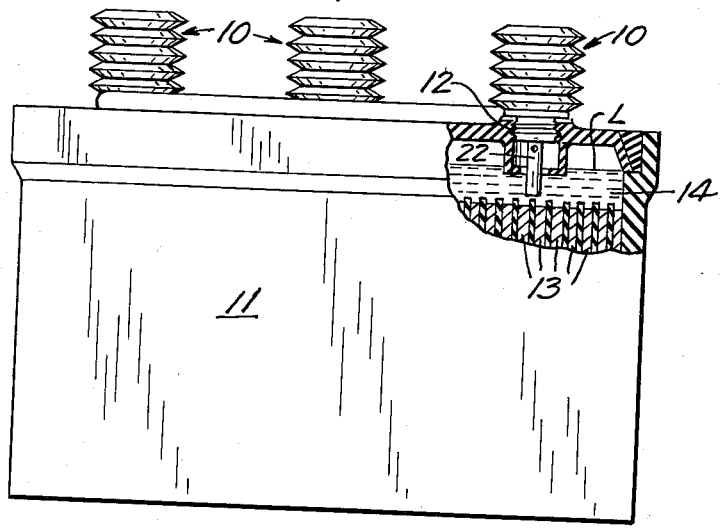
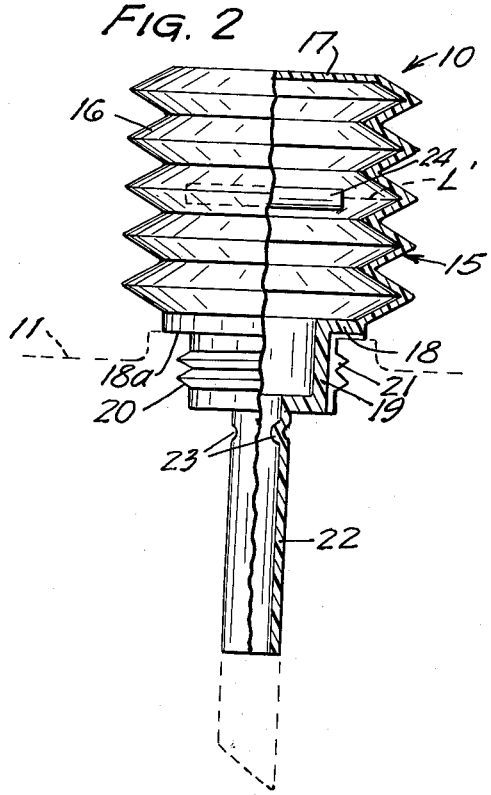
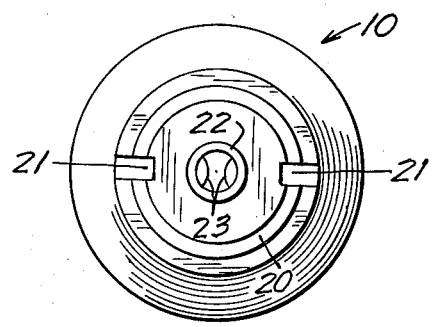
INVENTOR
HOWARD W. CONLEY
BY
Williamson & Palmatier
ATTORNEYS

United States Patent Office 3,095,009
Patented June 25, 1963

3,095,009
BATTERY LIQUID LEVEL CHECKER
Howard W. Conley, West Shore Drive,
Detroit Lakes, Minn.
Filed Nov. 21, 1960, Ser. No. 70,838
1 Claim. (Cl. 137—453)

This invention relates to a device for checking the level of liquid in an automobile type storage battery.

Although apparatus for the same general purpose as the instant invention have been known in the past, such prior art devices have had distinct disadvantages. One major disadvantage of the prior art devices is that they have been of relatively large construction and are not well adapted to be continuously attached to the battery so that the battery can be instantaneously checked at all of its cells at any time in a ready and easy manner. Another disadvantage of prior art devices is that it has not been possible to instantaneously check the level of liquid in the battery by merely viewing the device. Another distinct disadvantage of such prior art devices is that they have been of unduly complicated construction and therefore of such an expensive nature as to prevent their common usage.

An object of my invention is to provide a battery liquid level checking device of simple and inexpensive construction and operation.

Another object of my invention is to provide a novel battery liquid level checking device which may be readily and easily operated and which will give an instantaneous check of the level of liquid in the battery as well as the charge remaining on the battery.

A further object of my invention is to provide an improved and novel battery water level checking device which can be readily and easily adapted to fit substantially any of the commonly used automobile-type storage batteries, and which is constructed in a simple and improved manner as to reduce the cost of the apparatus so that the device will be used to replace the filler caps of storage batteries and therefore have an instantaneous way of checking the level of liquid in each of the cells of the battery.

These and other objects and advantages of my invention will more fully appear from the following description made in connection with the accompanying drawings wherein like reference characters refer to the same or similar parts throughout the several views and in which:

FIG. 1 is an elevation view of a storage battery, partly broken away and showing the liquid level checking device applied thereto;

FIG. 2 is an enlarged elevation view, partly in section, showing the construction details of the device; and FIG. 3 is a bottom plan view of the device.

One form of the present invention is shown in the drawings and is described herein. The battery liquid level and battery charge checking device is indicated in general by numeral 10 and is shown in FIG. 1 applied to a battery 11 in the threaded filler cap opening 12 thereof. It will be seen that the battery is of substantially conventional construction with the lead plates 13 submerged beneath the level L of the battery liquid 14, which is acid in nature and which varies in specific gravity, according to the charge on the battery. Of course the battery 11 is divided into a number of individual cells, each of which has an individual filler cap opening 12.

The battery liquid level and charge testing device 10 comprises an elongate and hollow enclosure 15 which is of an integral one-piece, molded resiliently flexible, and transparent plastic construction. The upper portion of the enclosure 15 has a generally cylindrically shaped but bellows-type vertically collapsible and extendable circumferential sidewall 16. A substantially flat, but flexible top wall 17 extends across and is sealed to the upper end of the circumferential sidewall 16. A bottom wall 18 is sealed to the lower end of the sidewall 16 and extends inwardly therefrom and is formed integrally with the generally cylindrical intermediate portion 10 of the enclosure 15. It will be seen that externally formed threads 20 are carried by the intermediate portion 19, and that the threads 20 have grooves 21 extending thereacross to form air-flow passageways in order to permit air to flow past the threads when the device 10 is assembled with the battery 11. The groove 21 also extends outwardly through the outer surface of the bottom wall 18 so that the shoulder surface 18a of the bottom wall may rest firmly upon the peripheral portion of the battery 11 surrounding the cap opening 12.

The lower portion of the enclosure 15 comprises an elongate tube 22, which is substantially smaller in diameter than the intermediate portion 19 so that the tube may extend down into the battery acid 14 of the battery 11 in the fashion shown in FIG. 1 and so as to clear any obstruction which may surround the cap opening 12. The tube 22 may be provided in any of a number of lengths, and will ordinarily be provided in a substantially longer length than that actually needed so that the tube 22 may be readily and easily cut off to the proper length so that the lower terminal end thereof will be disposed immediately above the battery plates when assembled with the battery as seen in FIG. 1.

The resilient tube 22 has a pair of resilient inwardly extending detents 23 which are disposed at the upper end of the tube immediately adjacent the intermediate portion 19 of the enclosure. The detents provide a function hereinafter more fully described.

The device 10 also includes a float 24 constructed of a material so as to have a specific gravity such that it will float on liquid 14 when the liquid is drawn from a battery which is in charged condition, and the float bar 24 will sink in liquid which is drawn from a battery which is in substantially discharged condition. The float bar 24 has a length in excess of the interior diameter of the intermediate portion 19, but somewhat less than the interior diameter of the generally cylindrical, but bellows-type sidewall 16 so that the float bar may float horizontally on the surface L' of the liquid in the enclosure 15. The float bar 24 is also of a size somewhat slightly less than the interior diameter of tube 22 so that the float bar 24 may be readily and easily assembled with the enclosure 15 and forced by the resilient inwardly extending detents 23. It will be noted that the detents 23 will thereby prevent outward movement of the float bar 24 and will actually prevent the float bar from materially extending into the tube 22 or obstructing the passageway thereof.

In normal use, one of the devices 10 will be inserted into each of the filler cap openings 12 of the battery 11 and will be left there permanently to replace the filler caps. When the level of the liquid in the battery is to be checked, a person will place his fingertips upon the top wall 17 and press downwardly and then remove his fingers from the topwall 17. The resilient nature of the plastic will cause the bellows-type sidewalls 16 to expand upwardly again, whereupon, liquid is drawn upwardly through the tube 22 and into the interior of the enclosure, substantially to the level L' as shown in FIG. 2. The liquid may be seen through the transparent sidewall 16 so that it will be concluded that the level of the liquid 14 in the battery is proper. If the level L of the liquid 14 is down close to the top of the battery plates 13 so that additional water should be added to the battery, then the lower end of tube 22 will not be in the liquid 14, and the liquid will not be drawn up into the enclosure 15 as the top wall is released. In this case the device 10 will be screwed out of the filler cap opening 12 and additional water will be added to the battery.

If the battery is fully charged, the float bar 24 will float upon the sufrace L' of the liquid in the enclosure 15, and if the battery is nearly discharged, the float bar 24 will sink below the level L'. When this is noticed through the transparent sidewall 16, the person will know that the charge on the battery is low and that the battery should be recharged.

When the liquid level in the battery has been checked and found to be proper, the liquid will remain in the enclosure 15, and if the level L of the liquid 14 in the battery decreases below the lower end of tube 22, the liquid from the enclosure 15 will drain back into the battery to replenish the liquid 14 therein.

It should be noted that even though the enclosure 15 has no liquid therein, that the length of the float bar 24 will substantially prevent the float bar from moving down into the intermediate portion 19, and the detents 23 will prevent the bar 24 from becoming lodged in the tube 22 and will also prevent the bar from falling out through the tube 22. When the bellows-type sidewall 16 is downwardly compressed, the sidewall is stabilized through the support given by the shoulder surface 18a of the bottom wall 18.

It will be seen that I have provided a new and improved battery liquid level and battery charge checking device which may be readily and easily operated by a person without soiling either his clothes or his hands and which may be attached permanently on the battery so that the condition of the battery may quickly checked at any time.

It will, of course, be understood that various changes may be made in the form, detail, arrangement and proportion of the parts without departing from the scope of my invention which consists of the matter described herein and set forth in the appended claim.

What I claim is:

A battery liquid level checking device comprising an elongate hollow enclosure of acid-resisting material having upper, lower and intermediate portions, said intermediate portion being substantially cylindrically shaped and having externally formed threads thereon to fit into the cap-mounting threads of a battery, said threads having a groove transversely thereacross to permit passage of air past the threads, the lower portion comprising an elongate tube having an upper end sealed to and communicating with said intermediate portion and having an open end to normally extend into the battery liquid, and said upper portion having a transparent, vertically collapsible and extendable bellows-type and generally cylindrical sidewall and a flat top wall extending across and sealed to the upper end of said sidewall, a bottom wall sealed to the lower end of said sidewall and also sealed to said intermediate portion and defining a shoulder surface at the lower end of said side wall to rest upon the periphery of the access opening into the battery and stabilizing the side wall when the same is depressed by fingertip action to draw liquid into said upper portion to be viewed through the transparent wall.

References Cited in the file of this patent

UNITED STATES PATENTS 2,751,928     Rook _____ June 26, 1956